Oct. 1, 1957   F. V. STINSON ET AL   2,807,926
PEANUT HARVESTING, SHAKING AND STACKING MACHINE
Filed Jan. 6, 1956   4 Sheets-Sheet 4
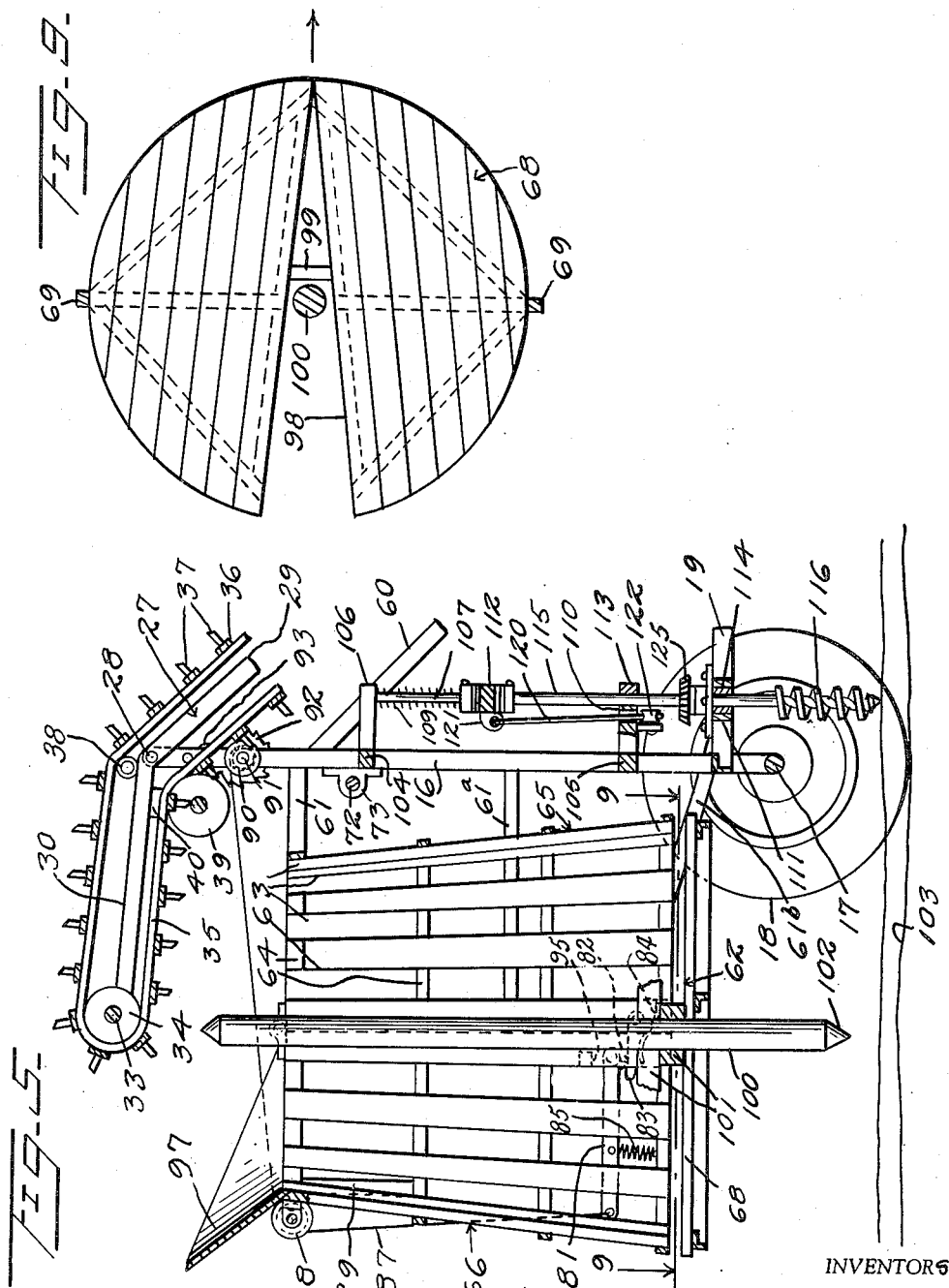
INVENTORS
Frank V. Stinson
Douglas O. Johnson
BY John N. Randolph
ATTORNEY

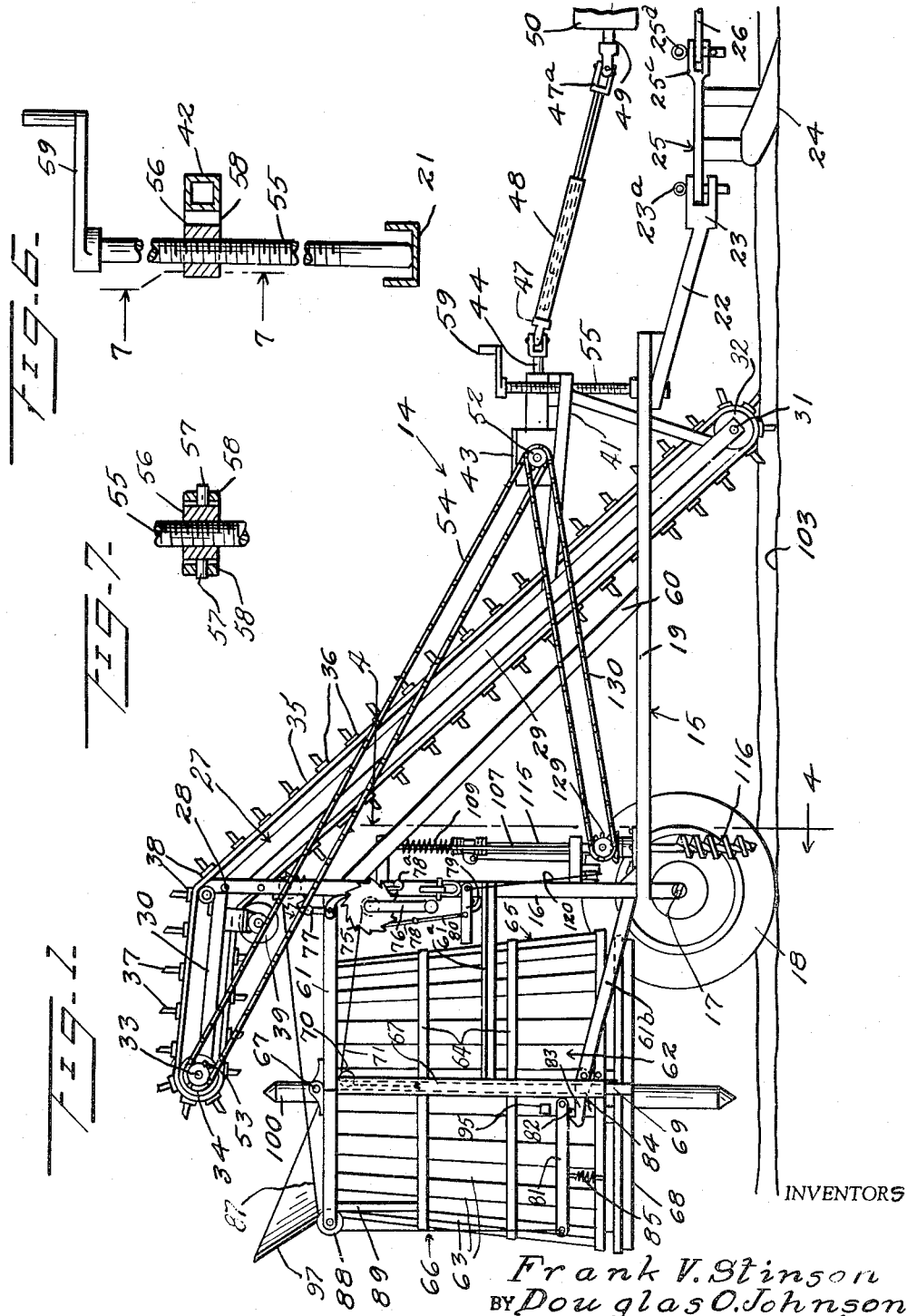

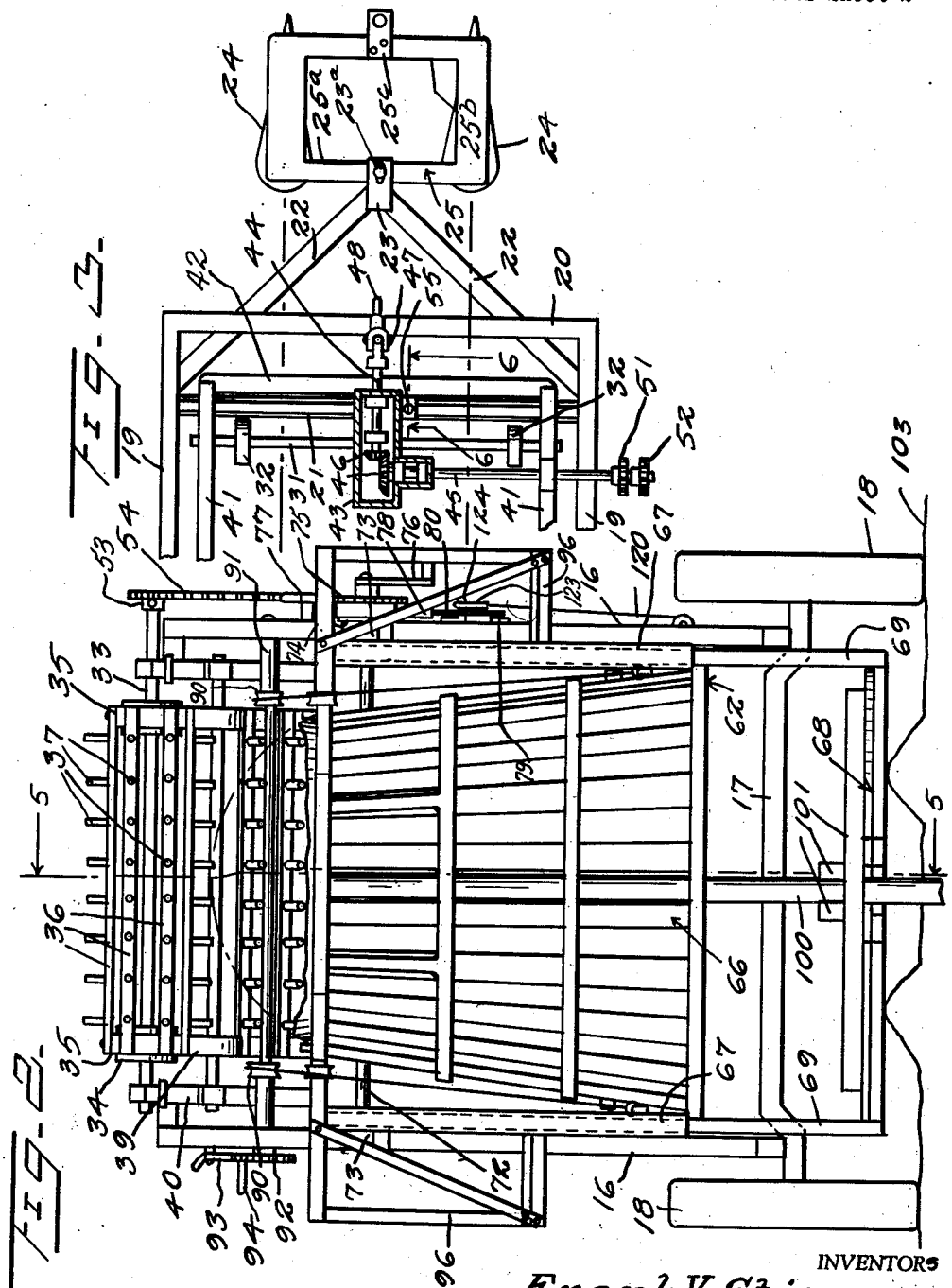

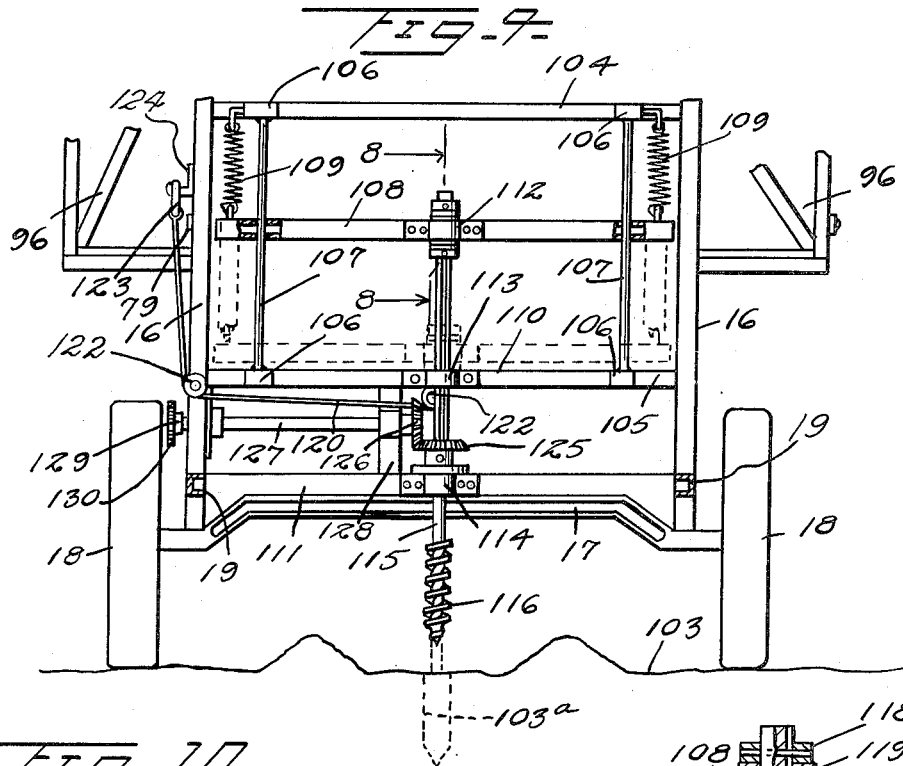
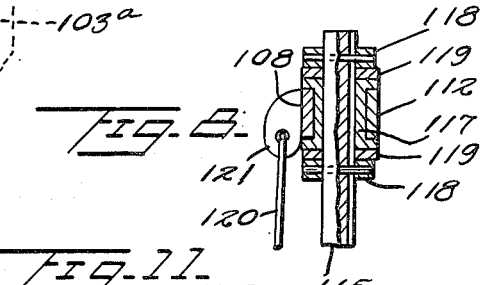
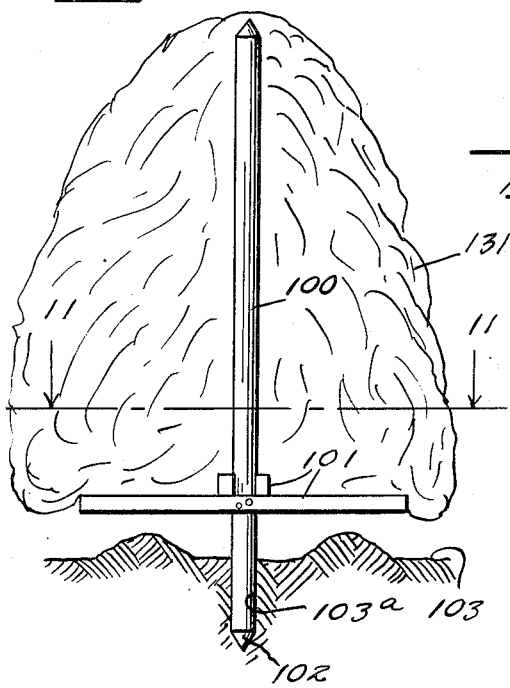
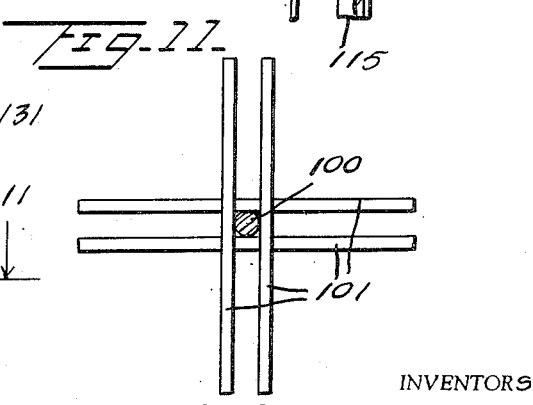

United States Patent Office 2,807,926
Patented Oct. 1, 1957

2,807,926

PEANUT HARVESTING, SHAKING, AND STACKING MACHINE

Frank V. Stinson, Troy, and Douglas O. Johnson, Brundidge, Ala.

Application January 6, 1956, Serial No. 557,771

7 Claims. (Cl. 56—346)

This invention relates to a novel machine for use in harvesting peanuts and similar vine growths, and has for its object to provide a machine including conveying means for picking up and depositing the laden vines in a receptacle and by means of which dirt, sand, stones and other foreign matter are shaken from the vines before deposit thereof in the receptacle of the machine.

Another object of the invention is to provide a trailer-type machine which is adapted to be drawn behind a draft vehicle such as a tractor, and including driven parts connected to and driven from the power source of the draft vehicle independently of the draft vehicle movement.

Still a further object of the invention is to provide a novel receptacle into which the vines are deposited and by means of which the mass of vines are formed into a stack around removable supporting means which is detachably supported by the machine and which is disengageable therefrom with a formed stack for supporting the stack in an upright position, when detached from the machine.

Still another object of the invention is to provide a machine wherein the discharged stacks will be shaped to most effectively shed moisture therefrom and by means of which the stacks are supported in an elevated position relative to the ground to provide good ventilation of the stack and a quick drying thereof.

Still a further object of the invention is to provide a machine having means for digging a hole in a correct position to receive a portion of the detached stack supporting means, to facilitate detachment of the stack and its supporting means from the machine and to maintain the stack and its supporting means in substantially an upright position when disengaged from the machine.

Various other objects and advantages of the invention will hereinafter become more fully apparent from the following description of the drawings, illustrating a presently preferred embodiment thereof, and wherein:

Figure 1 is a side elevational view of the machine, looking toward the right-hand side thereof;

Figure 2 is a fragmentary rear elevational view on an enlarged scale thereof;

Figure 3 is a fragmentary top plan view, partly in section, of the forward portion of the machine;

Figure 4 is a fragmentary cross sectional view on an enlarged scale, taken substantially along a plane as indicated by the line 4—4 of Figure 1;

Figure 5 is a fragmentary longitudinal sectional view of the rear portion of the machine, taken substantially along a plane as indicated by the line 5—5 of Figure 2;

Figure 6 is an enlarged fragmentary vertical sectional view of a portion of the machine, taken substantially along a plane as indicated by the line 6—6 of Figure 3;

Figure 7 is a fragmentary vertical sectional view taken substantially along a plane as indicated by the line 7—7 of Figure 6;

Figure 8 is an enlarged fragmentary vertical sectional view, taken substantially along a plane as indicated by the line 8—8 of Figure 4;

Figure 9 is a horizontal sectional view taken substantially along a plane as indicated by the line 9—9 of Figure 5;

Figure 10 is an elevational view of a portion of the machine shown detached therefrom, and Figure 11 is a horizontal sectional view taken substantially along a plane as indicated by the line 11—11 of Figure 10.

Referring more specifically to the drawings, the harvesting, shaking and stacking machine in its entirety and comprising the invention is designated generally 14 and in the preferred embodiment thereof as herein disclosed, constitutes a two wheeled type trailer adapted to be pulled by a suitable draft vehicle such as a tractor. The machine 14 includes a frame, designated generally 15, having spaced transversely aligned uprights 16 the lower ends of which are fixed to an axle 17. Transversely aligned ground engaging wheels 18 are journalled on the ends of the axle 17, outwardly with respect to the sides of the frame 15. The frame 15 includes corresponding side beams 19 which are fixed to and extend forwardly from lower portions of the uprights 16 and which are connected at their forward ends by a front cross member 20. The frame 15 includes another cross member 21 which extends between and is secured to the side beams 19, rearwardly of and adjacent the front cross member 20 and which is of channel shape in cross section.

A pair of arms 22 are fixed to forward portions of the side beams 19 and extend downwardly and forwardly therefrom in converging relation to one another and have forward ends which are connected to one another by a notched coupling element 23, which combines with said arms to form a tongue for the frame 15. As seen in Figures 1 and 3, a pair of laterally spaced plows 24 are supported beneath a rectangular frame 25, the intermediate portion of a rear crossbar 25a of which is received in the notch of the coupling element 23 and is connected thereto by a coupling pin 23a which extends downwardly through the coupling element 23 and through said rear bar 25a. A front bar 25b of the frame 25 has a coupling element 25c secured to and extending forwardly therefrom. A portion of a tractor drawbar 26, as seen in Figure 1, is received in the forwardly opening notch of the coupling element 25c and is connected thereto by a coupling pin 25d which extends downwardly through the coupler 25c and the drawbar 26.

An elevator frame 27 is pivotally mounted by a pivot means 28 to the upper ends of the uprights 16, between which a portion of the frame 27 is disposed. Said frame 27 has a forward portion 29 which extends downwardly and forwardly from its pivot 28 between said side beams 19. The rear portion 30 of the frame 27 is disposed at an angle of less than 180° to the forward frame portion 29 and extends rearwardly from the frame pivot 28, as clearly illustrated in Figures 1 and 5. An axle 31 is journalled in the lower, forward end of the forward frame portion 29 and has a pair of sprocket wheels 32 fixed thereto. An axle 33 is journalled in the upper rear part of the rear frame portion 30 and likewise has a pair of spaced sprocket wheels 34 keyed thereto.

A pair of endless chains 35 are trained over complementary sprocket wheels 32 and 34 and are connected to one another by a series of spaced bars or slats 36. The bars or slats 36 are disposed transversely of the chains 35 and each has a plurality of spaced tines or spikes 37 fixed thereto and extending outwardly therefrom. Said parts 35, 36 and 37 combine to form an endless conveyer or elevator. The frame 27 includes guide rollers 38 which are rotatably supported above and adjacent the pivot 28 to support the upper flights of the chains 35 in making the required change in direction in passing upwardly and rearwardly from the forward frame portion 29 to the rear frame portion 30. Similarly, the lower flights of said chains are supported by pulleys or rollers 39 which are suspended from the rear frame portion 30 by hangers 40, adjacent the pivot 28.

The lower frame portion 29 has forwardly and upwardly extending side braces 41 which extend upwardly between the side beams 19 behind the cross member 21 and between which the upper flight of the elevator is freely movable. The forward portions of the side braces 41 are connected by a cross brace 42, as best seen in Figure 3, which provides a support for a gear housing 43.

Adjacent ends of a pair of shafts 44 and 45 are journalled in the gear housing 43. Said shafts are disposed at substantially a right angle to one another and are connected to one another by a beveled gear connection 46 which is contained within the gear housing 43. The other forward end of the shaft 44 is connected by a universal joint 47 to one end of an extensible telescopic shaft 48, and the other end of said shaft is connected by a second universal joint 47a to a power take-off shaft 49 of a tractor, a part of which is shown at 50, and which tractor supports the drawbar 26. The shaft 45 is disposed crosswise of the machine 14 and has sprocket wheels 51 and 52 secured to the other end thereof and disposed outwardly with respect to a side of the machine frame 15. A sprocket wheel 53 is fixed to an end of the axle 33, in substantially the same vertical plane as the sprocket wheel 51. An endless drive chain 54 is trained over the sprocket wheels 51 and 53 for driving the endless conveyer or elevator from the power take-off shaft 49.

As best seen in Figures 6 and 7, a jackscrew 55 extends threadedly through a nut 56. The nut 56 has trunnions 57 which are journalled in a pair of arms 58 for supporting said nut rotatably between the arms 58. The arms 58 are fixed to and extend rearwardly from the cross member 42. A crank 59 is fixed to the upper end of the jackscrew 55. The lower end of the jackscrew 55 turnably engages against the cross member 21. Thus, the crank 59 may be manually turned for raising or lowering the forward elevator frame portion 29 about the frame pivot 28, to vary the elevation of the sprocket wheels 32, and the depth to which the tines 37 will penetrate the earth, as illustrated in Figure 1, in passing around said sprocket wheels 32.

The upper portions of the uprights 16 are braced relative to the side beams 19 by diagonal braces 60. Each of the uprights 16 is provided with vertically spaced rearwardly extending supporting arms 61, 61a and 61b. Said pairs of suporting arms provide a support for an upwardly tapered frusto-conical hopper or receptacle, designated generally 62, of openwork slatted construction, including circumferentially spaced vertically extending slats 63 which are connected by vertically spaced hoops 64. The hopper or receptacle 62 is divided vertically in half and includes a stationary front half 65 which is supported by the arms 61, 61a and 61b and a swingably mounted rear half which is hingedly connected at its upper end at 67 to the upper end of the stationary forward half 65. The supporting arms 61a and 61b also provide supports for transversely aligned vertical guide tubes 67 which are located adjacent the meeting edges of the hopper sections 65 and 66. The hopper or receptacle 62 also includes a hopper bottom 68 which is not directly connected to the sections 65 and 66. Said bottom 68 has rods 69 secured to and extending upwardly from diametrically opposie portions thereof. The rods 69 slidably fit the guide tubes 67. Pulleys 70 are journalled in the upper portions of the guide tubes 67, above the upper ends of the rods 69. Cables 71 are trained over the pulleys 70 and have lower ends extending downwardly into the tubes 67 and which are secured to the upper ends of the rods 69. The cables 71 extend forwardly from the upper ends of the tubes 67 and from said pulleys 70 and have opposite ends which are wound on a shaft 72. The shaft 72 is journalled in bearings 73 which are supported by the uprights 16. A brake drum 74, as seen in Figure 2, is fixed to the shaft 72 outwardly with respect to one of the bearings 73. A ratchet wheel 75 is fixed to the shaft 72, outwardly with respect to the brake drum 74. A crank 76 is attached to the shaft 72 beyond the ratchet wheel 75. A pawl 77, as best seen in Figure 1, is pivotally mounted on one of the support arms 61 directly above the ratchet wheel 75 to engage between the teeth thereof to permit the ratchet wheel and shaft 72 to be turned clockwise by the crank 76, as seen in Figure 1, for winding the cables 71 on the shaft 72 to lift the rods 69 and the bottom 68. However, the pawl 77 functions with the ratchet wheel 75 to prevent the shaft 72 from turning counterclockwise without manually swinging the pawl 77 out of engagement with said ratchet wheel. A brake band 78 is anchored at one end at 78a to a part of the frame 15 and is trained over the brake drum 74 and has its opposite end connected to a lever 79 by a connecting element 80. Lever 79 is pivoted at one end thereof to a part of the frame 15 at a point spaced from its connection to the element 80 and is adapted to be swung downwardly to tighten the brake band 78 against the brake drum 74 to resist rotation of the shaft 72 when the pawl 77 is released to allow the cables 71 to be unwound from the shaft 72 for lowering the hopper bottom 68.

Latching levers 81 are pivotally connected to the rear hopper section 66 adjacent the tubes 67 and extend rearwardly therefrom. The latching levers 81 adjacent their pivots have depending lugs 82 which engage behind upwardly facing latch hooks 83. The latch hooks 83 are pivotally connected to and extend rearwardly from the lower support arms 61b. Said arms 61b additionally support leaf springs 84 which yieldably support the latch hooks 83 in their positions as illustrated in Figure 1, in engagement with the lugs 82, to thus retain the rear hopper section 66 in its lower closed position. Pull springs 85 which are connected to the levers 81 and to the lower portion of the hopper section 66 urge the levers 81 downwardly. Cables 87 are attached to the rear ends of the levers 81 and extend upwardly therefrom over pulleys 88. The pulleys 88 are supported outwardly with respect to the rear hopper section 66 by supporting brackets 89 which are attached to the hopper section 66. The cables 87 extend forwardly from the pulleys 88 and have their opposite ends fastened to and wound on drums 90 which are fixed to a shaft 91. The shaft 91 is supported and journalled by the frame uprights 16 and has a ratchet wheel 92 secured to one end thereof and which is engaged by a pawl 93. The pawl 93 is pivotally mounted on a part of the frame 15 above the ratchet wheel 92 and functions in the same manner and for the same purpose as the pawl 77. A crank handle 94 is fixed to and extends outwardly from a part of the ratchet wheel 92 for turning the shaft 91 in a direction for winding the cables 87 on the drums 90. The teeth of the ratchet wheel 92 face in a direction to permit this turning movement of the shaft 91 but the pawl 93 must be manually released from engagement with the ratchet wheel 92 to allow the shaft 91 to turn in the opposite direction for paying out the cables 87 from the drums 90.

When the shaft 91 is turned in a direction for winding the cables 87 on the drums 90, the levers 81 will be initially swung upwardly to disengage the lugs 82 thereof from the latch hooks 83, after which the portions of said levers will strike the stops 95 which are supported by the hopper section 66. Further upward movement of the levers 81 being thus prevented, the cables 87 will thereafter cause the hopper section 66 to swing upwardly and rearwardly about its pivot 67 until said section 66 has nearly assumed a horizontal position, to thus expose the rear half of the hopper 62. When the cables 87 are payed outwardly from the drums 90 the hopper section 66 will swing downwardly toward its position of Figure 1 and as it approaches its position of Figure 1, the lugs 82 will strike and deflect the hooks 83 downwardly, after which downward pull of the springs 85 on the levers 81 will cause the lugs 82 to assume latched positions in engagement with the hooks 83 to thus automatically relatch the hopper section 66 in a closed position.

It will be noted that the support arms 61 and 61a additionally function to support platforms 96 which are located outwardly with respect to the sides of the machine 14 and on which the operators of the machine can conveniently stand for operating the cranks 76 and 94.

As best seen in Figure 1, the upper rear end of the elevator 35—37 is disposed almost directly above the center of the open top of the hopper or receptacle 62. The upper end of the rear hopper section 66 has an upwardly extending outwardly flared lip 97 forming a deflector and shield so that material discharged downwardly and rearwardly from the elevator will not be lost over the upper end of the rear hopper section 66 but rather will be deflected by the lip 97 into said hopper or receptacle 62.

As best seen in Figure 9, the hopper bottom 68 has a rearwardly opening slot 98 which tapers forwardly and which is closed forwardly of the center of the bottom 68 by a crossbar or stop 99. A stack supporting stake 100 is shown supported substantially centrally within the hopper 62. The stake 100 is provided with cross cleats 101, as best seen in Figure 11, which are adapted to rest on the bottom 68 to support the stake in the hopper 62, behind and adjacent the stop 99. As seen in Figure 5, the upper end of the stake protrudes from the open upper end of the hopper and terminates beneath the rear end of the endless conveyer or elevator, when the hopper bottom 68 is in a raised position. With the parts thus disposed, the pointed lower end 102 of the stake 100 is supported above the level of the ground, designated 103.

The uprights 16 are connected by crossbars 104 and 105 each of which supports a pair of forwardly extending arms 106, as seen in Figures 4 and 5. Guide rods 107 are supported by the vertically aligned arms 106 and provide a guide for a bar 108 and which slidably engages said rods 107. Pull springs 109 have upper ends anchored to the upper arms 106 and lower ends connected to the bar 108 for yieldably supporting said bar 108. A bar 110 extends between and is supported by the lower arms 106. A bar 111 extends between and is supported by the beams 19 beneath and in substantially vertical alignment with the bars 108 and 110. The bars 108, 110 and 111 have aligned bearings 112, 113 and 114, respectively. A spline shaft 115 extends slidably and turnably through said bearings and is provided with an auger 116 at the lower end thereof and which is disposed below the lower bearing 114. As seen in Figure 8, the upper bearing 112 contains a guide and thrust collar 117 in which a part of the shaft 115 is journalled. Collars 118 are secured to the shaft 115 above and below the guide and thrust collar 117, and thrust bearings 119 are mounted on said shaft 115 between said collars 118 and the flanged ends of the guide and thrust collar 117. One end of a cable or flexible element 120 is attached to an ear 121 which extends from a rear side of the bar 108 downwardly beneath guide pulleys 122, one of which is supported by the bar 110 and the other of which is mounted on one of the uprights 16. The other end of the flexible member 120 extends upwardly from the last mentioned pulley 122 and terminates in a handle 123 which is supported by a hook 124 adjacent one of the platforms 96.

A beveled gear 125 is splined to the shaft 115 and is supported on the lower bearing 114 in a position to mesh with a bevel gear 126 which is secured to a shaft 127. Shaft 127 is supported by bearings 128 which are in turn supported by the bar 111 and one of the beams 19. The other outer end of the transversely disposed shaft 127 has a sprocket wheel 129 fixed thereto and which is connected to the sprocket wheel 52 by an endless chain 130.

Assuming that the machine is being pulled in a direction from left to right as seen in Figure 1 by the tractor 50, the plows 24 will plow up the earth around vines of two adjacent rows in advance of the elevator 35—37. The power take-off shaft 49 will drive the shaft 45 for driving the elevator with the upper flight thereof traveling upwardly and rearwardly. The jackscrew 55 is adjusted so that the lower end of the elevator will be at a proper level relative to the ground level 103 in order that the vines will be picked up by the tines 37, behind the plows 24, as said tines pass under the lower sprocket wheels 32. Dirt, stones and the like will be shaken from the vines and discharged downwardly through the elevator during the travel of the vines upwardly and rearwardly along the frame portion 29. As the vines pass over and around the rear sprocket wheels 34, said vines will be discharged by gravity downwardly into the closed receptacle or hopper 62 through the open top thereof and around the stack pole 100 which is supported therein. When the hopper or receptacle 62 has thus been filled to its capacity by the aforedescribed operation of the machine 14 during its forward travel, forward motion of the machine will be stopped and an operator standing on one of the platforms 96 will then grasp and pull upwardly on the handle 123 to cause the cable 120 to exert a downward pull on the bar 108 to thus displace the splined shaft 115 downwardly through the bearings 113 and 114 to move the auger 116 downwardly. As the transverse shaft 127 is driven simultaneously with the elevator by the chain 130, the auger 116 will dig a hole 103a in the ground, as seen in Figure 4. The upward pull on the handle 123 is then released allowing the springs 109 to draw the bar 108, shaft 115 and auger 116 upwardly, back to their retracted positions as seen in full lines in Figure 4 and with the auger above ground level. The machine is then moved forwardly until the stack pole 100 is directly above the hole 103a.

With the brake band 78 held applied by the lever 79, the pawl 77 is released from the ratchet wheel 75 and the shaft 72 is permitted to turn slowly in a direction for unwinding the cables 71 therefrom, thus permitting the bars 69 to slide downwardly in the guide tubes 67 for lowering the hopper bottom 68, the stack pole 100 and the stack of vines 131 which is supported by the cross cleats 101, until the lower end 102 of the stack pole is in the bottom of the hole 103a. Said hole 103a is of such a depth that the cross cleats 101 will be disposed substantially above the level of the ground 103 when the lower end 102 of the pole is at the bottom of the hole 103a, so that the hopper bottom 68 can be lowered out of engagement with the cross cleats 101.

The crank 94 is then manually actuated for swinging the rear hopper section 66 upwardly and rearwardly to an open position, as previously described, after which the machine 14 is again pulled forward or to the right as seen in Figure 1 to leave the stack 131 supported by the stack pole 100 and cross cleats 101 above the ground 103, with the stack 131 shaped as seen in Figure 10 to readily shed moisture and supported above the level of the ground 103 to provide good ventilation so that the stacked vines 131 will dry quickly. If preferred, the rear hopper section 66 may be raised and held latched in a raised position before release of the pawl 77 to lower the hopper bottom 68 and the stack 131.

After unloading of a stack as previously described, another stack pole is applied to the hopper bottom 68, after which the hopper bottom is raised and latched in a raised position and the rear hopper section 66 is lowered and latched in a closed position, all as previously described, so that the aforedescribed operation can be repeated.

If desired, the frame 25 carrying the plows 24 can be omitted and the coupling means 23 can be coupled directly to the tractor drawbar 26, and plows carried by the tractor 50 may be utilized for uprooting the vines in advance of the elevator in lieu of the plows 24. Also, if desired, the plowing operation normally performed by the plows 24 may be accomplished separately, possibly a day in advance of the harvesting, to allow for partial drying out and seasoning prior to stacking.

Various other modifications and changes are contemplated and may obviously be resorted to, without departing from the function or scope of the invention as hereinafter defined by the appended claims.

We claim as our invention:

1. A machine of the character described comprising a mobile frame having a forward end and a rear end, a hopper having an open top supported by the rear end of said frame, an elevator mounted in said frame including a lower forward end adapted to be disposed adjacent ground level and an upper rear end disposed above the open top of said hopper, means driving said elevator for conveying material upwardly thereon and for discharging material therefrom into said hopper, said hopper being shaped in such a manner as to form the material received therein into a stack, and means for opening the hopper to effect discharge of the stacked material therefrom and from the machine, said hopper comprising a stationary front section, a movable rear section and a movable bottom, said rear section being pivotally connected at its upper end to the upper end of the front section and being swingable by operation of said last mentioned means upwardly and rearwardly away from the front section to an open position, said hopper bottom being slidably movable upwardly and downwardly and being supported and actuated by a portion of said last mentioned means, latch means releasably latching the rear section in a closed position relative to the front section of the hopper, said latch means including a part connected to a part of the means for opening said hopper for effecting release of said latch means and for thereafter exerting a lifting force on said rear hopper section, said hopper bottom having a rearwardly opening slot, a stack pole extending through said slot, stack supporting means secured to said stack pole and resting on the hopper bottom for supporting an upper part of the stack pole within and longitudinally of the hopper and around which the material discharged from said elevator is formed into a stack, said stack pole and the supporting means thereof being dischargeable from the hopper with the stack formed therearound upon opening of the hopper, said stack supporting means functioning to support the stack when discharged from the hopper in an elevated position above the ground.

2. A machine as in claim 1, said stack pole having a lower portion adapted to be lowered into a hole in the ground beneath the hopper bottom when said hopper bottom is lowered for anchoring the stack pole and stack to the ground to facilitate discharge of the stack from the open hopper by a forward movement of the machine.

3. A machine of the character described comprising an elongated mobile frame having a forward end and a rear end, a hopper having an open top supported by the rear end of said frame, an elevator mounted in said frame including a lower forward end adapted to be disposed adjacent ground level and an upper rear end disposed above the open top of said hopper, means driving said elevator for conveying material upwardly thereon and for discharging material therefrom into said hopper, said hopper being shaped in such a manner as to form the material received therein into a stack, and means for opening the hopper to effect discharge of the stacked material therefrom and from the machine, said hopper having a frusto-conical side wall of slatted openwork construction including a swingably mounted rear section constituting a semicircular half of said side wall, said rear section being operatively connected to said hopper opening means and swingably movable rearwardly and upwardly to an open position of said hopper wall, said hopper including a bottom, and means slidably connecting the bottom to the other front stationary section of the hopper wall for vertical sliding movement, from a closed position adjacent the level of the lower end of the hopper wall, downwardly to an open position beneath and spaced from said lower end of the hopper wall.

4. A machine of the character described comprising a mobile frame having a forward end and a rear end, a hopper having an open top supported by the rear end of said frame, an elevator mounted in said frame including a lower forward end adapted to be disposed adjacent ground level and an upper rear end disposed above the open top of said hopper, means driving said elevator for conveying material upwardly thereon and for discharging material therefrom into said hopper, said hopper being shaped in such a manner as to form the material received therein into a stack, and means for opening the hopper to effect discharge of the stacked material therefrom and from the machine, coupling means at the forward end of said frame adapted to be flexibly coupled to a draft vehicle by which the machine is adapted to be propelled, said elevator drive means including an adjustable forwardly extending shaft adapted to be detachably coupled to a power take-off shaft of the draft vehicle.

5. In a machine of the character described, a mobile frame having a forward end and a rear end, a hopper supported on the rear end of said frame and having an open top, means carried by said frame for conveying and discharging material into the hopper through the open top thereof, said hopper including a side wall of circular cross section which tapers from the lower end toward the open top thereof, said side wall including a stationary front section and a movable rear section, means swingably connecting said rear section to the front section adjacent the open top of the hopper for upward and rearward swinging movement of said rear section to an open position, each of said wall sections being substantially semi-circular, said hopper including a bottom, and means supported by said front section for slidably supporting the hopper bottom for vertical sliding movement, said last mentioned means supporting the hopper bottom adjacent the lower end of the hopper side wall in a closed position thereof and substantially therebeneath in an open position of the hopper.

6. In a machine as in claim 5, said hopper bottom having a rearwardly opening slot, a stack pole extending through said slot, stack supporting means secured to said stack pole and resting on the hopper bottom for supporting an upper part of the stack pole within and longitudinally of the hopper and around which the material discharged into the open top of the hopper is formed into a stack, said stack pole and the supporting means thereof being discharged from the hopper with the stack formed therearound when said rear section is swung upwardly to an open position and said hopper bottom is lowered, said stack supporting means functioning to support the stack when discharged from the hopper in an elevated position above the ground.

7. In a machine as in claim 6, said stack supporting means comprising cross cleats secured to and extending outwardly from the stack pole.

References Cited in the file of this patent

UNITED STATES PATENTS

| 1,456,467 | Savignac | May 22, 1923 |
| 2,500,441 | Vander Schuur et al. | Mar. 14, 1950 |
| 2,516,473 | McLendon | July 25, 1950 |
| 2,727,352 | Jones | Dec. 20, 1955 |

FOREIGN PATENTS

| 676,024 | France | Nov. 18, 1929 |
| 111,221 | Sweden | Aug. 2, 1944 |